Dec. 18, 1962  A. P. BEILER  3,069,172
MANURE SPREADER
Filed Oct. 12, 1960  5 Sheets-Sheet 1
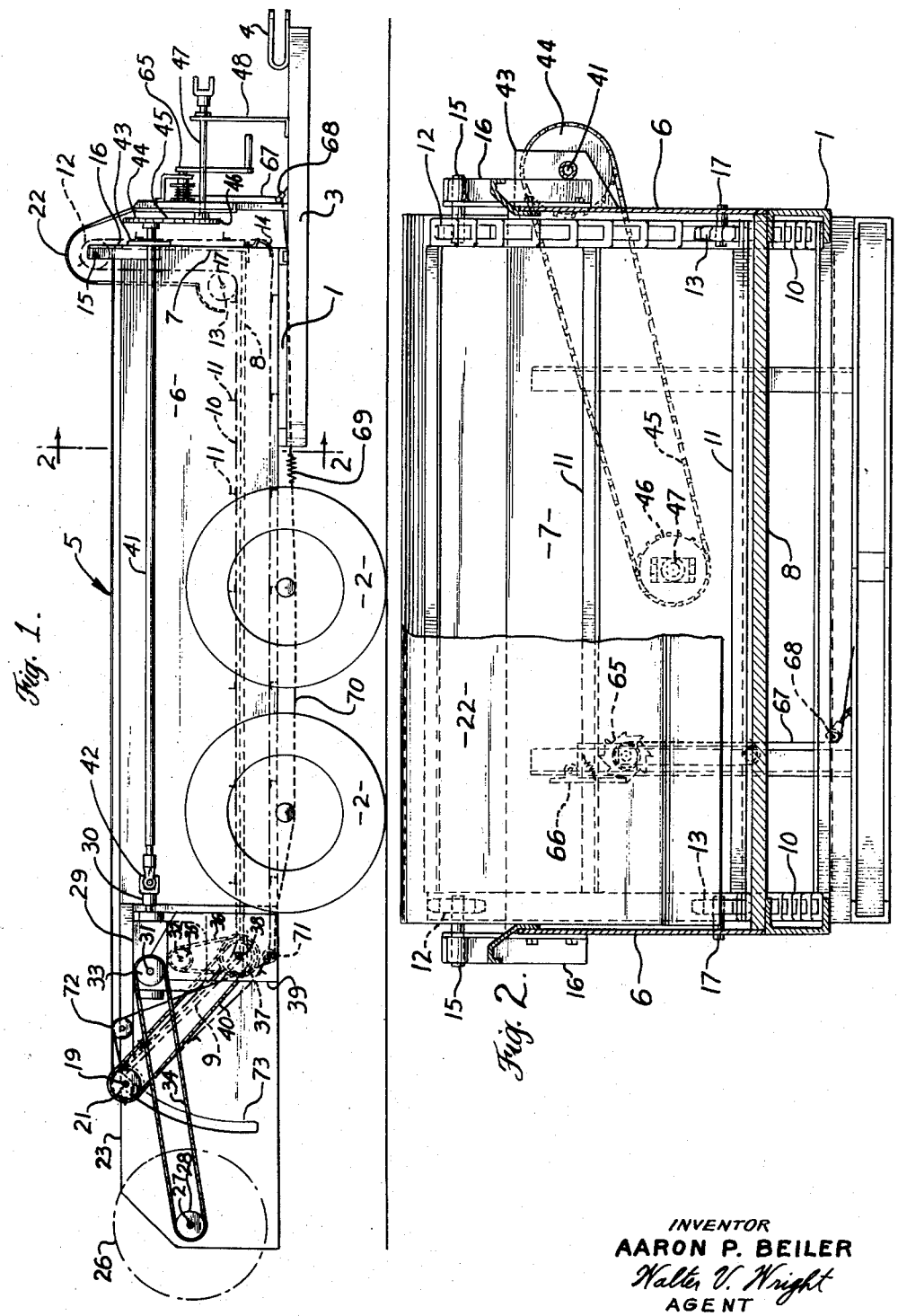
INVENTOR
AARON P. BEILER
Walter V. Wright
AGENT

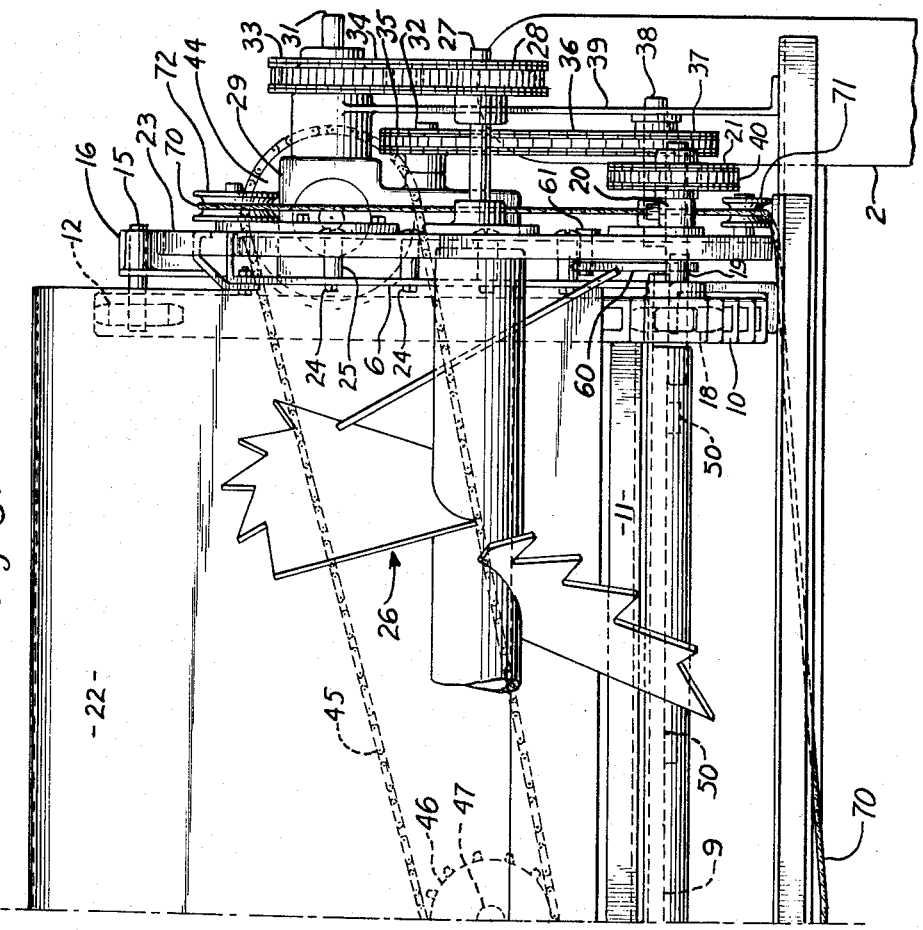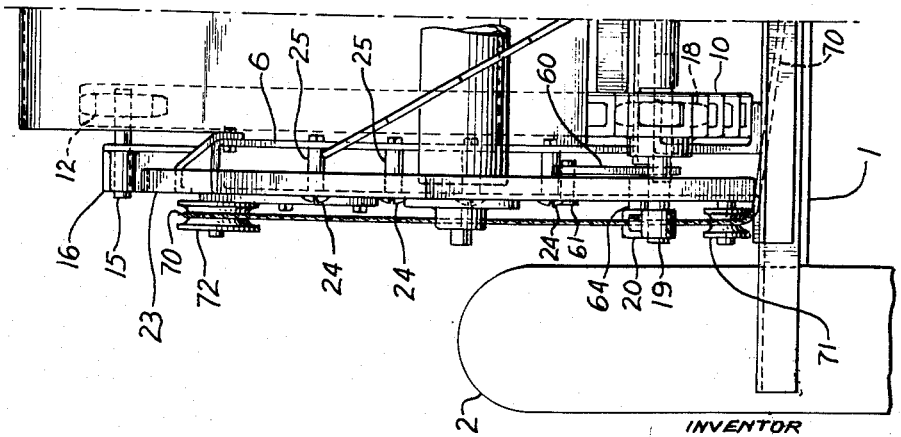

Dec. 18, 1962  A. P. BEILER  3,069,172
MANURE SPREADER
Filed Oct. 12, 1960  5 Sheets-Sheet 3

INVENTOR
AARON P. BEILER
Walter V. Wright
AGENT

Fig. 5.
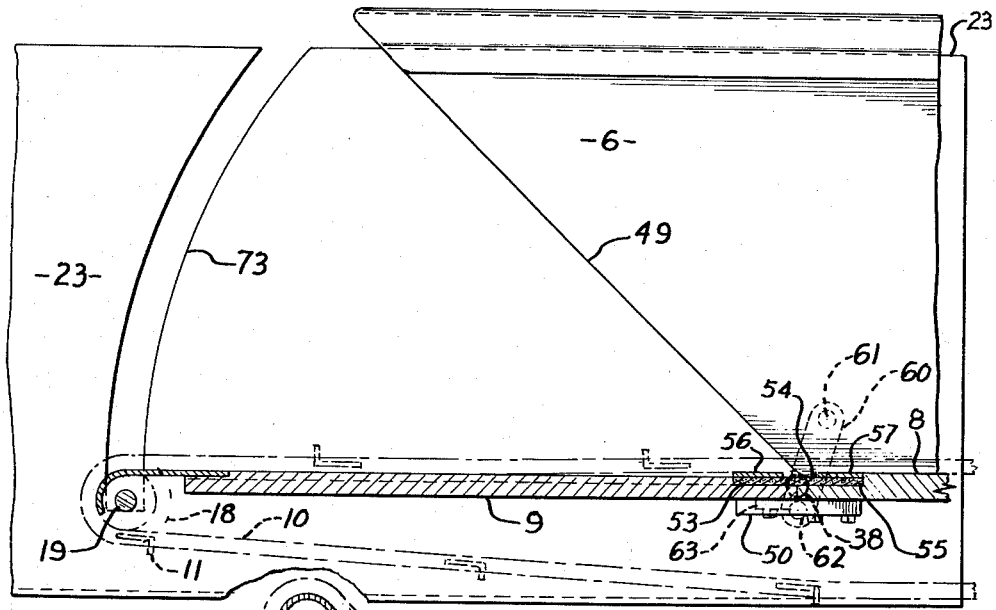
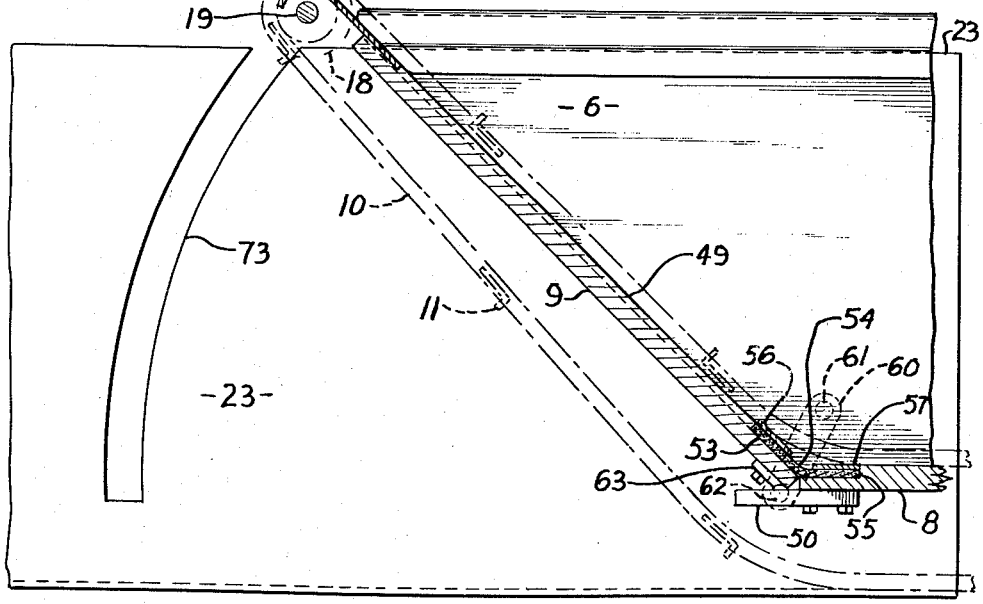
Fig. 6.
INVENTOR
AARON P. BEILER
Walter V. Wright
AGENT

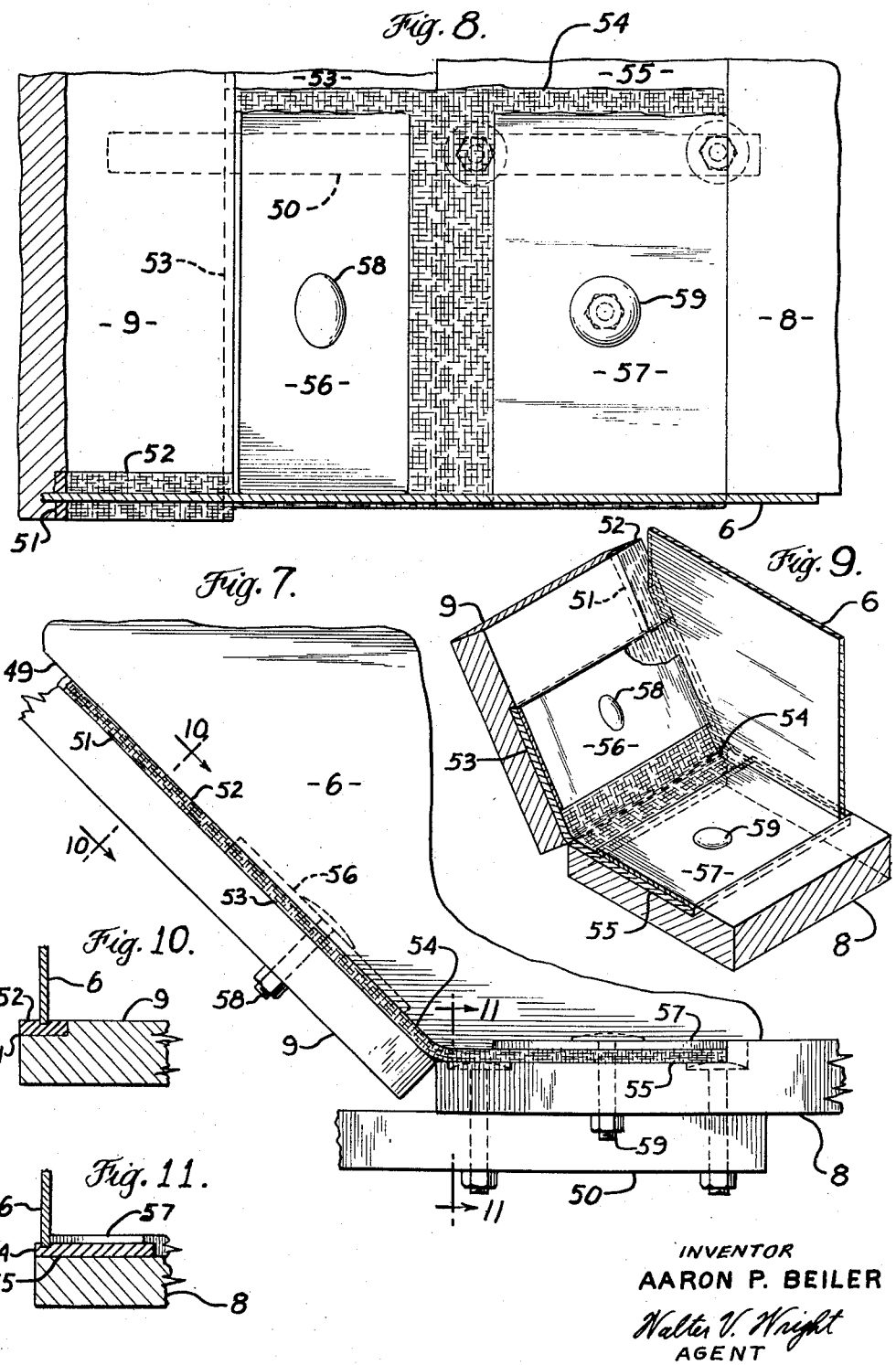

United States Patent Office 3,069,172
Patented Dec. 18, 1962

3,069,172
MANURE SPREADER
Aaron P. Beiler, Gap, Pa., assignor to Sperry Rand Corporation, New Holland, Pa., a corporation of Delaware
Filed Oct. 12, 1960, Ser. No. 62,156
16 Claims. (Cl. 275—6)

This invention relates to manure spreaders and more particularly to manure spreaders of the "liquid" type.

In recent years, in the field of agriculture, the fertilizing quality of the large quanties of liquid normally associated with manure has been recognized. Conventional manure spreaders do not provide for retention of these liquids in the spreader, hence, a large portion of the fertilizing quality of the manure is lost, with the escape of the liquids from the spreader, prior to delivery at the field.

It has been known, in the past, to provide a removable shield, or gate, at the rear end of the manure spreader to prevent the manure from falling from the spreader on the way to a field. These shields, however, do not prevent the fluids from escaping.

Fuid-tight bodies have been provided on manure spreaders wherein a rear wall is provided on the spreader and the entire body is raised like a conventional dump truck when it is desired to discharge the material. These spreaders require a source of power, such as the PTO of the towing vehicle, to elevate the body. This adds to the cost of the spreader and the power required for its operation, particularly where the PTO of the towing vehicle is also required to drive the scattering and feeding mechanism. It is also an undesirable feature of this type of spreader that the scattering mechanism mounted on the rear of the spreader body becomes progressively closer to the ground and less effective as the forward end of the body is raised.

It is an object of this invention to provide a rugged economical manure spreader which will prevent the escape of liquids from the manure prior to the time of distribution in the field.

It is also an object of this invention to provide a manure spreader having a pivoted rear end wall which will prevent the escape of liquids prior to the time of distribution in a field, while facilitating distribution of the manure at the desired time and place.

Another object of this invention is to provide a manure spreader having a fluid retaining rear wall which lowers to become an extension of the bottom of the spreader when it is desired to discharge the load.

It is a further object of this invention to provide means to positively feed material rearwardly over the bottom and over a pivotable rear end wall of a liquid-tight manure spreader body.

It is another object of this invention to provide a manure spreader having a novel, economical, liquid-tight seal between a pivoted rear wall and the bottom and sides of the spreader.

Still another object of this invention is to provide a novel mechanism for pivoting the end wall of a manure spreader relative to the bottom thereof whereby no stress will be created in the liquid sealing member between said rear wall and bottom when the wall is pivoted.

Other objects and advantages of this invention will be apparent upon reading the following disclosure in light of the accompanying drawings, in which:

FIG. 1 is a side elevational view of a manure spreader constructed in accordance with the principles of this invention;

FIG. 2 is an enlarged sectional view taken on the line 2—2 of FIG. 1 with a portion of the feed apron shield broken away;

FIG. 3 is a further enlarged rear end view of the manure spreader of FIG. 1 with a portion broken out to condense the figure;

FIGS. 5 and 6 are fragmentary sectional views similar to FIG. 4, but with parts omitted to more clearly show the two positions of the rear end wall;

FIG. 7 is a fragmentary side elevational view illustrating the sealing means, with the end wall in raised, or transport, position;

FIG. 8 is a plan view of FIG. 7;

FIG. 9 is an isometric view of the sealing means showing its relationship to the bottom, end wall and one side wall;

FIG. 10 is a fragmentary section taken on line 10—10 of FIG. 7; and

FIG. 11 is a fragmentary section taken on the line 11—11 of FIG. 7.

Figure 4:
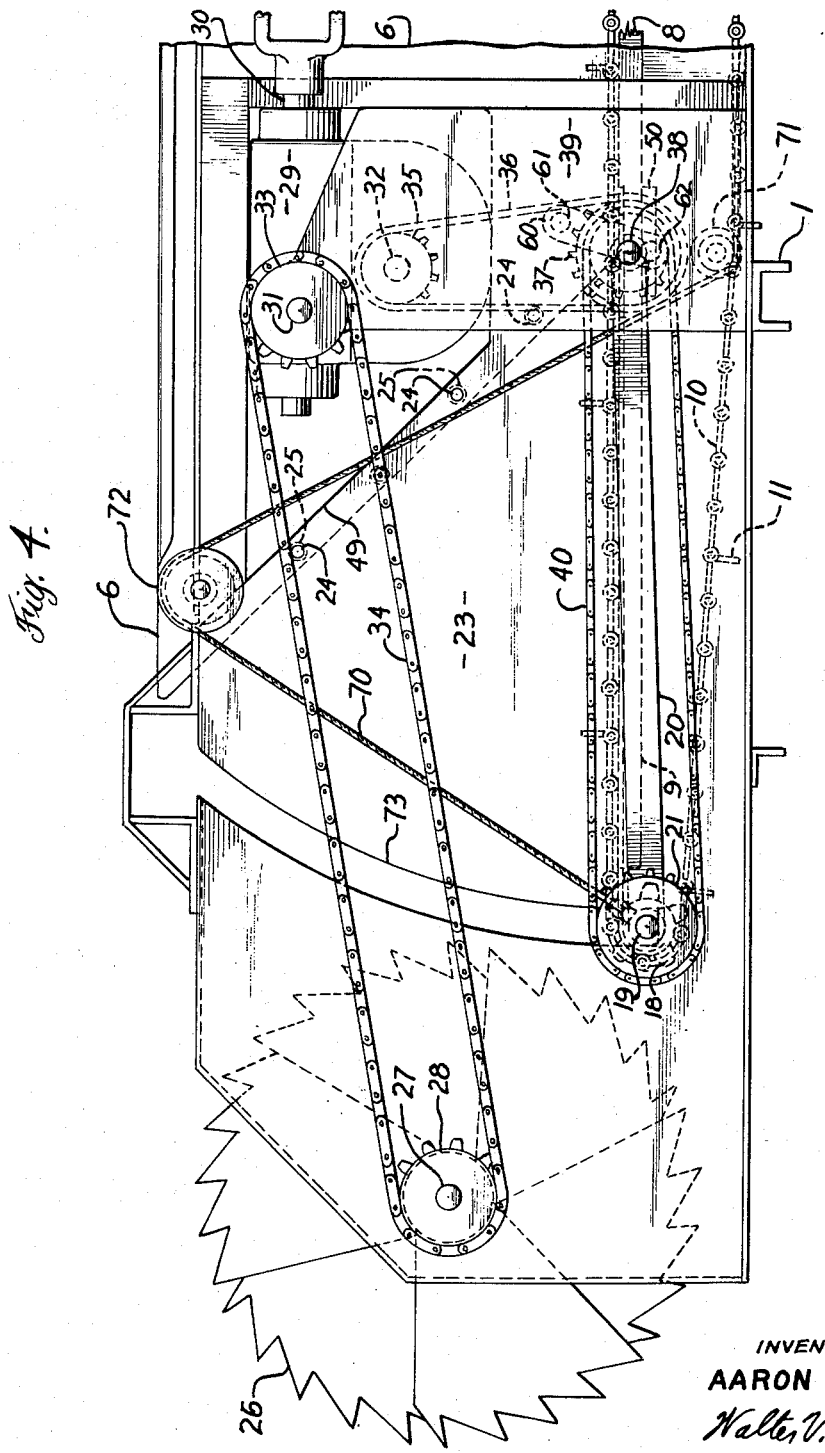
FIG. 4 is a fragmentary side elevational view of the rear end of the manure spreader of FIG. 1 and on an enlarged scale.

The relationship, in general, of the various elements of this invention may be clearly seen in FIGS. 1 through 3. The numeral 1 refers to conventional manure spreader frame structure supported by ground wheels 2 and being provided at the front end with a drawbar 3 having a towing hitch 4. A fluid-tight body 5 is fixedly mounted on frame 1 and includes two side walls 6, a front wall 7, a bottom 8 and a pivotal rear end wall 9 (shown in an upwardly and rearwardly inclined position in FIG. 1).

A feed apron completely encompasses front wall 7, bottom 8 and rear end wall 9. The feed apron comprises a pair of spaced parallel endless chains 10 (see FIGS. 2 and 3) connected by transverse cross bars 11. An upper pair of idler sprockets 12, a lower pair of idler sprockets 13 and an arcuate guide 14 (shown in FIG. 1) guide the chains 10 of the feed apron around front wall 7. The sprockets 12 are carried on stub shafts 15 which are journalled in vertical brackets 16 carried by side walls 6. The sprockets 13 rotate about stub shafts 17 mounted on side walls 6.

A pair of stub shafts 19 carrying sprockets 18, are journalled in rear wall 9 at the rear-most end thereof. The stub shafts 19 are also journalled in longitudinally extending arms 20 (see FIG. 4). The arms 20 will be more fully discussed hereafter. The stub shaft 19, seen at the right side of FIG. 3, also carries a drive sprocket 21 through which the feed apron is driven in a counterclockwise direction (as seen in FIG. 1). The feed apron moves downwardly over the rear face of front wall 7, rearwardly over bottom 8 and rear wall 9 and then forwardly along the underside of end wall 9 and bottom 8 to forward wall 7. As best seen in FIG. 1, a shield 22 covers the feed apron on its downward path over the rear face of front wall 7. The apron is operative to feed material rearwardly over bottom 8 and rear end wall 9. The shield 22 is carried by the vehicle frame structure adjacent the front end thereof and also serves as a guard for certain moving parts located in front of front wall 7.

Extending rearwardly along the outside of side walls 6, from positions in front of rear end wall 9, is a pair of spaced vertical plates, or side wall extensions, 23. The plates, or extensions, 23 extend rearwardly beyond end wall 9 and are mounted by bolts 24 (FIGS. 3 and 4) to side walls 6. Spacer sleeves 25 surround bolts 24 thereby providing greater spacing, in the transverse direction, between extensions 23 than that existing between side walls 6 (see FIG. 3). Conventional beater mechanism 26 is journalled in extensions 23 rearwardly of end wall 9. Beater mechanism 26 includes a shaft 27 which projects laterally beyond one extension 23 (the one on the right side as seen in FIG. 3) and carries a drive sprocket 28.

Driving power is supplied to the beater mechanism and feed apron in the following manner: A gear box 29 having an input shaft 30 and two output shafts 31 and 32 is carried by one side wall 6. The gear box 29 is of a well known type which produces continuous rotation of upper output shaft 31 and intermittent rotational movement of lower output shaft 32 in response to continuous rotation of input shaft 30. Output shaft 31 carries a sprocket 33 which continuously drives sprocket 28 of the beater mechanism through endless chain 34. Lower output shaft 32 carries a sprocket 35 which, through endless chain 36, imparts intermittent movement to one side of a double sprocket 37. Double sprocket 37 is journalled on a shaft 38 which has one end mounted in side wall extension 23 and the other end mounted in a vertical plate 39. Plate 39 also serves as a covering hood for this portion of the drive mechanism. The remaining side of double sprocket 37 drives the sprocket 21 through an endless chain 40. As described above (see FIG. 3), shafts 19 are journalled in arms 20 and end wall 9. Sprockets 21 and 18 are fixed to the shaft 19 on the right side in FIG. 3; therefore, the movement imparted to sprocket 21 by chain 40 is transferred through shaft 19 to right sprocket 18 to drive chain 10 of the feed apron.

Extending forwardly from input shaft 30 of gear box 29 is a long shaft 41. The rear end of shaft 41 is coupled to input shaft 30 as shown at 42 in FIG. 1. The forward end of shaft 41 is journalled in a bearing plate 43 carried by front wall 7 of the spreader body. A sprocket 44, carried by the forward end of shaft 41, is driven from a sprocket 46 by an endless chain 45. Sprocket 46 is mounted on and driven by a shaft 47 which has its rear end journalled in the supporting structure for apron shield 22 and its forward end journalled in a vertical bracket 48. It will be seen in FIGS. 1 and 2 that shaft 47 is positioned to be coupled to the PTO of a towing vehicle connected to hitch 4.

The rear end wall 9 of the spreader body is mounted for pivotal movement between a lowered, discharge position as seen in FIG. 5 and a raised, transport position as seen in FIG. 6. The width of end wall 9 is greater than the spacing between side walls 6, but less than the spacing between side wall extensions 23; therefore, when end wall 9 is in raised position, it engages the upwardly and rearwardly inclined edges 49 of end wall 6 and when it is in lowered position, extensions 23 prevent material from falling over the side edges thereof. It will be seen in FIG. 5, that when end wall 9 is in discharge position, it constitutes a rear extension of bottom 8. A plurality of supporting arms 50 are mounted on the under side of bottom 8, at spaced points along the rear edge thereof, in position to support the forward edge of end wall 9 when it is in lowered position (see FIGS. 3, 5 and 6).

As stated above, end wall 9 engages rear edges 49 of side walls 6 when the end wall is in raised, or transport, position. As seen in FIGS. 7 through 10, end wall 9 is mortised at 51, along each side edge, to receive strips of flexible sealing material 52. The sealing strips 52 may be rubber, or the like, and are positioned to engage rear edges 49 of side walls 6 when end wall 9 is in transport position (see FIG. 10). A second mortise 53 extends transversely across rear end wall 9 at the forward edge thereof. The rear half of a transversely extending flexible seal member 54 is received in mortise 53. The forward half of transverse sealing member 54 is received in a mortise 55 provided in the upper face of bottom 8 and extending thereacross at the rear edge of bottom 8. Seal 54 is held in place by a pair of plates 56 and 57 which are, respectively, bolted to rear end wall 9 and bottom 8 by round head bolts 58 and 59. In this manner, the joint between end wall 9 and bottom 8 is rendered fluid-tight, as are the joints between side wall 6 and rear end wall 9 when the end wall is in raised, or transport, position.

It will be seen from an inspection of FIGS. 5 and 6, that if flexible sealing member 54 were in a relaxed condition in the position shown in FIG. 6, it would be stretched when end wall 9 was lowered to the position shown in FIG. 5. On the other hand, if seal 54 were designed to be in a relaxed condition in the position of FIG. 5, it would tend to buckle when rear end wall 9 was raised to the position of FIG. 6. Applicant has found that the stresses produced in seal 54 by continual flexing or stretching thereof, in combination with the corrosive properties of manure, results in early failure of seals employed in the location occupied by seal 54. One of the features of this invention is to special hinge structure which eliminates stresses in the fore-and-aft directions in seal 54 when end wall 9 is raised and lowered. This eliminates stretching and buckling of the seal and reduces the stress thereon to simple bending stress. In spite of the corrosive nature of the cargo, a simple rubber seal provides long service life under these improved conditions. The hinge mechanism for rear end wall 9 will now be described.

With reference to FIGS. 3 and 5, the pair of links 60, one at each side of the spreader, have their upper ends pivotally mounted on pins 61 carried by extensions 23. Pivot pins 62 at the lower ends of arms 60 are journalled in hinge-like brackets 63 mounted on the underside of end wall 9 adjacent the forward edge thereof. Thus, it will be seen that as end wall 9 moves up and down about pivot pins 62, the links 60 and pins 62 are free to move away from, and toward, the rear end of bottom 8 about pins 61. The arms 20 (see FIG. 4) previously described in connection with the drive mechanism for the feed apron, carry stub shafts 19 at their rear-most ends. The inboard ends of stub shafts 19 are journalled in end wall 9. The forward-most end of one of the arms 20 (the one on the right side of the spreader as seen in FIG. 3) is journalled on shaft 38. The forward-most end of the remaining arm 20 (the one seen on the left side of the spreader in FIG. 3) is journalled on a pin 64 carried by the extension 23 on the left side of the spreader. The pin 64 is, of course, coaxial with shaft 38. As seen in FIGS. 4 and 5, the axis of shaft 38 (and pin 64) is slightly vertically spaced above pivot pin 62. Thus, the rear-most end of end wall 9, through stub shafts 19 and arms 20, pivots about the axis of shaft 38 and pin 64 which is eccentric relative to pivot pins 62 about which the forward end of end wall 9 pivots. As a result of this relationship, the forward edge of end wall 9 is moved slightly rearwardly about pins 61 as the wall is raised from the position shown in FIG. 5 to the position shown in FIG. 6. The amount of rearward movement of the forward edge of wall 9 is equal, but opposite, to the extent of forward movement of the upper forward edge of end wall 9 due to its pivotal movement about pivot pin 62. When end wall 9 is lowered from the position shown in FIG. 6 to the position shown in FIG. 5, the same relative movements occur in equal amounts but in opposite directions. Thus, no stresses in the longitudinal direction of the spreader are transferred through seal 54 when the rear end wall 9 is raised and lowered.

The means by which end wall 9 is raised and lowered comprises a windlass 65 mounted at the front of the spreader and including a releasable pawl and ratchet locking mechanism 66 (see FIG. 2). A single cable 67 extends from the windlass to a pulley 68 at the bottom forward part of the spreader (see FIGS. 1 and 2). From pulley 68, the cable extends rearwardly below the spreader body to a coil spring 69. Two cables 70 extend rearwardly from spring 69 and outwardly to the sides of the spreader at the rear end thereof. A pair of pulleys 71 located on opposite sides of the spreader at the bottom rear part thereof, respectively, guide cables 70 upwardly to a second pair of pulleys 72 located rearwardly and above pulleys 71. From pulleys 72, the cables extend to the rear-most end of arms 20 and are connected thereto.

The operator may raise end wall 9 by cranking windlass 65 in a counterclockwise direction as seen in FIG. 2. To lower end wall 9, the operator releases pawl and ratchet latch 66 and rotates windlass 65 in a clockwise direction as seen in FIG. 2. Since the arms 20, cables 70 and associated pulleys are located on the outside of side wall extensions 23, an arcuate slot 73 is provided in each side extension 23 for passage of stub shafts 19 when the end wall is raised and lowered.

The operation of the manure spreader of this invention is very simple. The spreader is filled with end wall 9 in raised position. The filling operation often occurs gradually over a considerable period of time. The fluids gradually gavitate to the bottom of the spreader but cannot escape as in the case of open end spreaders. In actual practice it has been found that the jarring of the load which normally occurs in traveling over conventional rough farm roads tends to work the fluids back up into the solids to some degree. Upon reaching the desired field, the farmer couples shaft 47 to the PTO of the tractor, lowers end wall 9 by windlass 65 and begins the spreading operation.

This spreader is economical to produce, requires less power than equal capacity spreaders employing body dumping mechanism and may be operated at the same ground speed from the beginning of the spreading operation to the end. Whereas in conventional spreaders with dumping bodies the scattering mechanism lowers and becomes less effective as the front of the body is raised, and consequently must be reduced in ground speed as spreading progresses if uniform spreading is to be obtained.

While this invention has been described in connection with a particular embodiment thereof, it will be understood that it is capable of further modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. A manure spreader comprising a frame, a fluid-tight box mounted on said frame and having side walls and a bottom, each of said side walls having an extension carried thereby and projecting rearwardly therefrom, a rear end wall extending between said side walls, means mounting said end wall for pivotal movement about a transverse axis adjacent said bottom, means for pivotally raising and lowering said end wall relative to said side walls and bottom about said axis and between said side wall extensions, said end wall forming an extension of said bottom when in lowered position, scattering mechanism disposed between said side wall extensions rearwardly of said end wall, means to convey material rearwardly over said bottom and said end wall to said scattering mechanism when the end wall is in its lowered position, and means providing a liquid-tight seal between said end wall and said side walls and bottom when the end wall is in raised position.

2. A manure spreader comprising a frame, a fluid-tight box mounted on said frame and having side walls and a bottom, a fluid impervious end wall extending between said side walls and upwardly from said bottom, means mounting said end wall for pivotal movement about a transverse axis adjacent said bottom, means for pivotally raising and lowering said end wall relative to said side walls and bottom about said axis, said end wall forming an extension of said bottom when in lowered position, means to convey material rearwardly over said bottom and said end wall, a liquid-tight seal between said bottom and said end wall, and means providing a liquid-tight seal between said side walls and said end wall when said end wall is in raised position.

3. A manure spreader comprising a frame, a fluid-tight box mounted on said frame and having side walls and a bottom, scattering mechanism mounted rearwardly of said bottom, an end wall extending between said side walls and rearwardly from said bottom, means to pivotally raise and lower said end wall relative to said side walls and bottom about a transverse axis adjacent said bottom, a feed apron movable over said bottom and said end wall to convey material rearwardly to said scattering mechanism, a liquid-tight seal between said end wall and said bottom, and means providing a liquid-tight seal between said end wall and said side walls when said end wall is in raised position.

4. A manure spreader comprising a frame, a fluid-tight box mounted on said frame and having a forward wall, side walls and a bottom, a rear wall extending between said side walls and upwardly and rearwardly from a position adjacent the rear end of said bottom, a flexible sealing member extending between said rear wall and said bottom and providing a fluid-tight seal therebetween, means mounting said rear wall for pivotal movement relative to said side walls and bottom about a transverse axis adjacent the rear end of said bottom, means for pivoting said rear wall about said axis from an upper position to a lower position wherein said rear wall forms an extension of said bottom, and means moving said transverse axis, respectively, toward and away from said bottom in response to downward and upward pivotal movement of said rear wall to prevent stress in said sealing member.

5. A manure spreader comprising a frame, a fluid-tight box mounted on said frame and having a forward wall, side walls and a bottom, a rear wall extending between said side walls and upwardly and rearwardly from a position adjacent the rear end of said bottom, a flexible sealing member extending between said rear wall and said bottom and providing a fluid-tight seal therebetween, means mounting said rear wall for pivotal movement relative to said side walls and bottom about a transverse axis adjacent the rear end of said bottom, means for pivoting said rear wall about said axis from an upper position to a lower position wherein said rear wall forms an extension of said bottom, means moving said transverse axis, respectively, toward and away from said bottom in response to downward and upward pivotal movement of said rear wall to prevent stress in said sealing member, and means providing a liquid-tight seal between said rear wall and said side walls when said rear wall is in its upper position.

6. A manure spreader comprising a frame, a fluid-tight box mounted on said frame and having a forward wall, side walls and a bottom, a rear wall extending between said side walls and upwardly and rearwardly from a position adjacent the rear end of said bottom, a flexible sealing member extending between said rear wall and said bottom and providing a fluid-tight seal therebetween, means mounting said rear wall for pivotal movement relative to said side walls and bottom about a transverse axis adjacent the rear end of said bottom, means for pivoting said rear wall about said axis from an upper position to a lower position wherein said rear wall forms an extension of said bottom, means moving said transverse axis, respectively, toward and away from said bottom in response to downward and upward pivotal movement of said rear wall to prevent stretching and buckling of said sealing member, means providing a liquid tight seal between said rear wall and said side walls when said rear wall is in its upper position and a feed apron movable over said bottom and said rear wall to convey material rearwardly over said bottom and said rear wall when the rear wall is in its lowered position.

7. A manure spreader comprising a frame, a fluid-tight box mounted on said frame and having a forward wall, side walls and a bottom, said side walls extending rearwardly beyond said bottom, scattering mechanism mounted on said side walls rearwardly of said bottom, a rear wall extending between said side walls and rearwardly from a position adjacent the rear end of said bottom, a flexible sealing member extending between said rear wall and said bottom and providing a fluid-tight seal therebetween, means mounting said rear wall for pivotal movement relative to said side walls and bottom about a transverse axis adjacent the rear end of said bottom, means for pivoting said rear wall about said axis from an upper transport position to a lower discharge position wherein said rear wall forms an extension of said bottom, means moving said transverse axis, respectively, toward and away from said bottom in response to downward and upward pivotal movement of said rear wall to prevent stretching and buckling of said sealing member, means providing a liquid-tight seal between said rear wall and said side walls when said rear wall is in its transport position, and a feed apron movable over said bottom and said rear wall to convey material rearwardly thereover to said scattering mechanism when said rear wall is in its discharge position.

8. A manure spreader comprising a frame, a fluid-tight box mounted on said frame and having side walls and a bottom, a rear wall extending between said side walls and rearwardly from a position adjacent the rear end of said bottom, a flexible sealing member extending between said rear wall and said bottom and providing a liquid tight seal therebetween, means mounting said rear wall for pivotal movement relative to said side walls and bottom about a transverse axis adjacent the rear end of said bottom, and means moving said transverse axis toward said bottom in response to pivotal movement of said rear wall in one direction to prevent stretching of said sealing member and away from said bottom in response to pivotal movement of said rear wall in the opposite direction to prevent buckling of said sealing member.

9. A manure spreader comprising a frame, a fluid-tight box fixedly mounted on said frame and having a forward wall, side walls and a bottom, a rear wall extending between said side walls and rearwardly from said bottom, means mounting said rear wall for pivotal movement about a transverse axis adjacent said bottom, means for pivotally raising and lowering said rear wall relative to said side walls and bottom, said rear wall forming an extension of said bottom when in lowered position, a flexible sealing member extending between said rear wall and said bottom and providing a fluid-tight seal therebetween, and means providing a liquid-tight seal between said side walls and said rear wall when the rear wall is in raised position.

10. A manure spreader comprising a frame, a fluid-tight box mounted on said frame and having a forward wall, side walls and a bottom, a rear wall extending between said side walls and upwardly and rearwardly from a position adjacent the rear end of said bottom, a flexible sealing member extending between said rear wall and said bottom and providing a fluid-tight seal therebetween, hinge means connected to said rear wall and providing a horizontal transverse axis about which said rear wall is pivotal, means connecting said hinge means to said side walls for movement toward and away from said bottom, and means moving said hinge means toward said bottom in response to movement of said rear wall about said axis in one direction and away from said bottom in response to movement of said rear wall about said axis in the opposite direction to prevent stretching and buckling of said sealing member.

11. A manure spreader as recited in claim 10 wherein said side walls extend rearwardly beyond said bottom and have a rear edge inclined upwardly and rearwardly from said bottom, said rear wall being pivotal about said hinge means from a raised position wherein it seats against the rear edges of said side walls to a lowered position wherein it is coextensive with said bottom, extensions projecting rearwardly from said side walls and between which said rear wall moves whereby when said rear wall is in lowered position said extensions prevent material from escaping over the side edges of said rear wall.

12. A manure spreader as recited in claim 11 wherein sealing means are carried by said rear wall in position to be engaged by said side walls when said rear wall is in raised position thereby providing a fluid-tight seal between said rear wall and said side walls when said rear wall is in raised position.

13. A manure spreader as recited in claim 10 wherein said hinge means comprises a pair of links, each link having one end pivotally mounted on one of said side walls and the other end pivotally connected to said rear wall adjacent said bottom, said links being disposed outside said fluid-tight box.

14. A manure spreader as recited in claim 10 wherein said means moving said hinge means in response to movement of said rear wall comprises an arm having one end pivotally connected to said rear wall and the other end mounted for pivotal movement about a fixed axis displaced from the axis about which said rear wall is pivotal.

15. A manure spreader as recited in claim 14 wherein said one end of said arm is pivotally connected to said rear wall substantially at the rear-most edge thereof and said other end of the arm is pivotally mounted adjacent said hinge means.

16. A manure spreader as recited in claim 15 wherein said arm is disposed outside said fluid-tight box.

References Cited in the file of this patent

UNITED STATES PATENTS

| | | |
|---|---|---|
| 1,285,368 | Potter | Nov. 19, 1918 |
| 1,435,766 | Varland | Nov. 14, 1922 |
| 1,558,164 | Haney | Oct. 20, 1925 |
| 1,909,238 | Thompson | May 16, 1933 |
| 2,360,125 | Griffiths | Oct. 10, 1944 |
| 2,467,718 | Acton | Apr. 19, 1949 |
| 2,717,783 | Flink | Sept. 13, 1955 |
| 2,885,209 | Bruecker | May 5, 1959 |
| 2,930,625 | Kreider | Mar. 29, 1960 |